United States Patent [19]

Sanada

[11] Patent Number: 5,623,389
[45] Date of Patent: Apr. 22, 1997

[54] CONDUCTIVE PASTE AND MULTILAYERED CERAMIC CAPACITOR EMPLOYING THE SAME

[75] Inventor: Tomoki Sanada, Kyoto, Japan

[73] Assignee: Murata Manufacturing Co., Ltd., Japan

[21] Appl. No.: 478,346

[22] Filed: Jun. 7, 1995

[30] Foreign Application Priority Data

Jun. 20, 1994 [JP] Japan ................. 6-137200

[51] Int. Cl.⁶ .................. H01G 4/008; H01G 4/06
[52] U.S. Cl. ................. 361/321.1; 361/321.4; 361/321.5; 361/322; 361/313
[58] Field of Search ............... 361/321.1, 321.3, 361/321.4, 321.5, 306.1, 311, 313; 106/1.18, 1.26; 252/512; 29/25.42

[56] References Cited

U.S. PATENT DOCUMENTS 5,336,301 8/1994 Tani et al. ............... 106/1.18
5,376,596 12/1994 Tokuda et al. ............ 501/19

FOREIGN PATENT DOCUMENTS

| 1-196112A | 8/1989 | Japan | 361/321.5 |
| 2-39411A | 2/1990 | Japan | 361/306.1 |
| 2-39410A | 2/1990 | Japan | 361/321.5 |
| 2-39408A | 2/1990 | Japan | 361/321.5 |
| 2-109314A | 4/1990 | Japan | 361/311 |

*Primary Examiner*—Leo P. Picard
*Assistant Examiner*—Anthony Dinkins
*Attorney, Agent, or Firm*—Ostrolenk, Faber, Gerb & Soffen, LLP

[57] ABSTRACT

A conductive paste comprises a conductive powder and a glass frit, the glass frit consisting of PbO, $B_2O_3$, $SiO_2$, $Al_2O_3$ and $Bi_2O_3$, the content of $Bi_2O_3$ in the glass frit being 4.0 to 30.2 percent by weight.

12 Claims, 2 Drawing Sheets

CONDUCTIVE PASTE AND MULTILAYERED CERAMIC CAPACITOR EMPLOYING THE SAME

BACKGROUND OF THE INVENTION

1. Field of the Invention

The present invention relates to a conductive paste used for formation of external electrodes of multilayered ceramic capacitors, and a multilayered ceramic capacitor employing the same.

2. Description of the Prior Art

In general, external electrodes of multilayered ceramic capacitors are produced by applying a conductive paste on a multilayered capacitor chip, drying the conductive paste layers on the chip, firing them to form conductive underlayers of the electrodes as well as to remove organic components contained in the paste, and then plating the conductive layers with nickel, and tin or solder.

The conductive paste used for such a purpose is usually prepared by dispersing conductive powder (e.g., Ag) and glass frit such as lead glass, zinc glass, or borosilicate glass in an organic vehicle dissolved in an organic solvent.

However, the external electrodes of the prior art frequently involve some problems which are caused by the plating solution seeping into the ceramic layers during plating. For example, the plating procedure causes a decrease in adhesion of the external electrodes of the multilayered ceramic capacitor and in resistance to flexure of the substrate on which the ceramic chip capacitor is mounted, and cracks of the ceramic layers due to heat shock.

To solve such problems, it has been proposed to increase the content of glass frit in the conductive paste or to use a chemically stable glass frit with a high-melting point for the purpose of protecting the ceramic layers from seepage of the plating solution during plating. However, a large amount of glass frit or use of high-melting point glass frit causes cracks in the ceramic layers of the capacitor chip during baking step and a decrease in the plating properties. In particular, if the dielectric ceramic layers are of a lead oxide-containing ceramic composition, they lose in their characteristics as they react with glass frit in the conductive paste layers when the external electrodes are baked at high temperatures, resulting in decrease of the capacitor characteristics.

SUMMARY OF THE INVENTION

It is therefore an object of the present invention to provide a conductive paste which overcomes the aforesaid disadvantages, enables provision of external electrodes on multilayered ceramic capacitors having high adhesion to the external electrodes, a high resistance to heat shock, and a high resistance against flexure of substrate.

According to the present invention, the above and other objects are achieved by providing a conductive paste comprising a conductive powder and a glass frit, wherein said glass frit consists essentially of PbO, $B_2O_3$, $SiO_2$, $Al_2O_3$ and $Bi_2O_3$, and wherein the content of $Bi_2O_3$ in the glass frit is 4.0 to 30.2 percent by weight.

It is preferred that the glass frit contains no zinc oxide. If zinc oxide is present as an inevitable impurity in the glass frit, it is preferred to use glass frit of which a content of ZnO is 0.1% by weight or below.

A preferred glass frit consists essentially, by weight, of 45 to 75% of PbO, 8 to 11% of $B_2O_3$, 3.5 to 5.0% of $SiO_2$, 5 to 15% of $Al_2O_3$, and 4.0 to 30.0 $Bi_2O_3$.

Further, it is preferred that the ceramic dielectric layers are of a lead oxide-containing ceramic composition. Preferred lead oxide-containing ceramic composition includes, for example, compositions of a system $Pb(Zr_{0.52}Ti_{0.48})O_3$, $Pb(Fe_{2/3}W_{1/3})O_3$—$Pb(Fe_{1/2}Nb_{1/2})O_3$, $Pb(Mg_{1/3}Nb_{2/3})O_3$—$PbTiO_3$, $Pb(Ni_{1/3}Nb_{2/3})O_3$—$Pb(Mg_{1/2}W_{1/2})O_3$—$PbTiO_3$, and $Pb(Mg_{1/3}Nb_{2/3})O_3$—$Pb(Ni_{1/3}Nb_{2/3})O_3$—$PbTiO_3$.

According to the present invention, there is also provided a multilayered ceramic capacitor (FIG. 3) comprising internal electrodes layers (2) separated one another by ceramic dielectric layers (1), and two external electrodes (3) connected to alternate internal electrodes, wherein said external electrodes contains a glass frit essentially of PbO, $B_2O_3$, $SiO_2$, $Al_2O_3$ and $Bi_2O_3$, the content of $Bi_2O_3$ in the glass frit being 4.0 to 30.2 percent by weight.

According to the present invention, it is possible to produce multilayered ceramic capacitors having high adhesion of external electrodes, a high resistance to heat shock, and a high resistance against flexure of substrate.

These and other objects and features of the present invention will become clear from the following examples.

EXAMPLES

Figure 1:
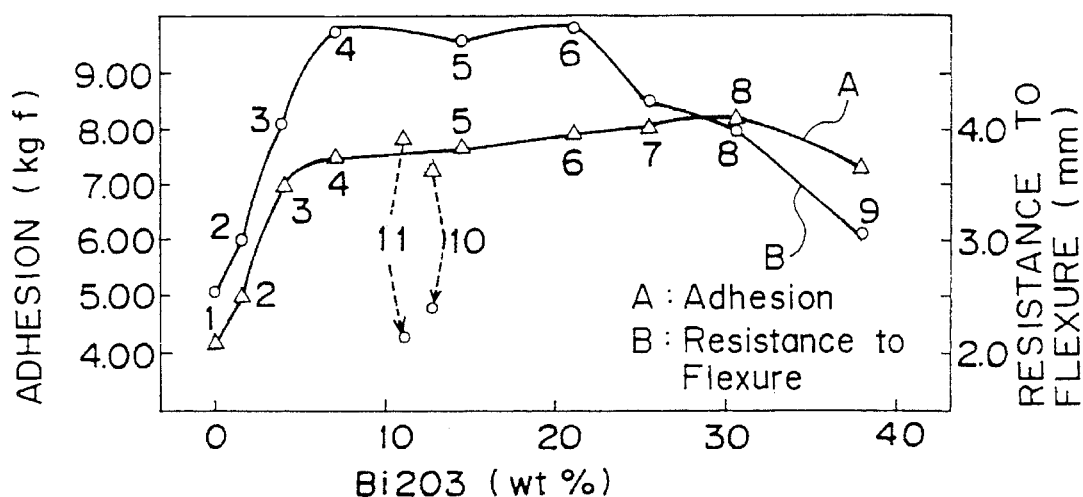
FIG. 1 is a graph showing relationships between content of $Bi_2O_3$ and adhesion strength of external electrodes, and between the content $Bi_2O_3$ and resistance to flexure of substrate.

Using $Pb_3O_4$, $H_3BO_3$, $SiO_2$, $Al(OH)_3$ and $Bi_2O_3$ as raw materials, there were prepared eleven kinds of glass frits in the following manner: The raw materials and zinc oxide (used as an impurity) were weighed and mixed in proportions shown in Table 1. Each of the resultant mixture was fused at a high temperature and then cooled rapidly to prepare a vitreous material. The resultant vitreous material was ground into frit with a mean particle size of about 3 μm. In Table 1, the compositions with an asterisk (*) are out of the scope of the present invention, while the other composition are those falling within the scope of the present invention.

TABLE 1

| No | PbO | $B_2O_3$ | $SiO_2$ | $Al_2O_3$ | $Bi_2O_3$ | ZnO |
| --- | --- | --- | --- | --- | --- | --- |
| *1 | 82.5 | 11.0 | 5.5 | 1.0 | 0 | 0 |
| *2 | 78.8 | 10.4 | 5.2 | 4.0 | 1.6 | 0 |
| 3 | 71.0 | 10.0 | 5.0 | 10.0 | 4.0 | 0 |
| 4 | 63.1 | 11.0 | 4.9 | 12.5 | 8.5 | 0 |
| 5 | 59.2 | 8.8 | 4.0 | 11.8 | 16.2 | 0 |
| 6 | 54.2 | 9.5 | 4.2 | 10.8 | 21.3 | 0 |
| 7 | 51.1 | 8.9 | 4.0 | 10.2 | 25.8 | 0 |
| 8 | 47.6 | 8.4 | 3.8 | 10.0 | 30.2 | 0 |
| *9 | 43.1 | 7.4 | 3.0 | 8.2 | 38.3 | 0 |
| *10 | 59.7 | 10.4 | 4.6 | 11.9 | 12.3 | 1.1 |
| *11 | 58.3 | 8.9 | 4.4 | 13.1 | 11.0 | 4.3 |

Using each of the above glass frits, a conductive paste was prepared by mixing 5 wt % of the glass frit and 66 wt % of Ag powder with 29 wt % of an organic vehicle composed of ethyl cellulose dissolved in ethylene glycol butyl ether, and dispersing the glass frit and Ag powder in the organic vehicle by means of a three roll mill.

Each conductive paste was applied on opposite sides of previously prepared, bare multilayered ceramic capacitors and then baked at 630° C. for 30 minutes in air to prepare conductive coatings on the multilayered ceramic capacitor. The conductive coatings were plated with Ni and then with Sn-Pb to form external electrodes, whereby multilayered ceramic chip capacitors were completed.

The bare multilayered ceramic capacitors employed have dimensions of 3.2×1.6×1.0 mm and include eighteen ceramic dielectrics layers of $95Pb(Mg_{1/3}Nb_{2/3})O_3$—$5PbTiO_3$ and seventeen internal electrode layers of Ag-Pd.

The resultant multilayered ceramic chip capacitors were subjected to a test for resistance to flexure of substrate, an adhesion test, and a heat shock test.

The test for resistance to flexure of substrate was carried out in accordance with procedures specified in Appendix 2 of JIS C 6429. The capacitor was soldered to a copper-laminated substrate composed of glass fabric base epoxy resin having a thickness of 1.6 mm. The substrate was placed with its surface on which the capacitor is mounted downward. Then, the middle part of the substrate was pressurized successively by a pressurizing rod until the capacitor begins to damage. The deflective amount of the substrate when the capacitor has begun to damage was determined as the resistance of the capacitor to flexure of substrate.

The test for adhesion strength of external electrodes was carried out in the following manner: Wire leads were respectively soldered to ends of the external electrodes of the capacitor and pulled at a constant rate in the axial direction until the external electrodes break. The destructive strength was at which the external electrodes have broken was determined as the adhesion strength.

The test for heat shocks was carried out by dipping the capacitor into a fused solder kept at 325° C. in an atmosphere of 25° C., for a duration of 3 seconds. After dipping, the capacitor was visually checked no determine presence of any cracks.

Figure 2:
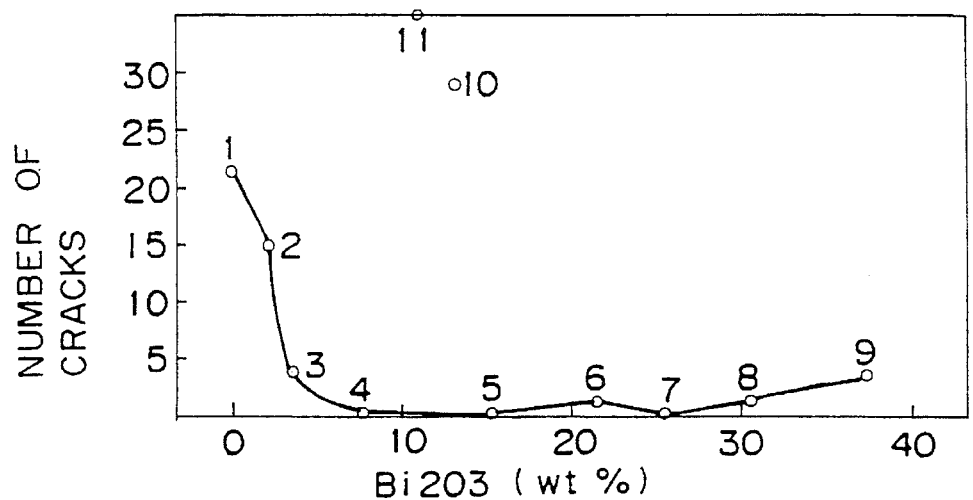
FIG. 2 is a graph showing a relationship between a content of $Bi_2O_3$ and resistance to heat shock.
Figure 3:
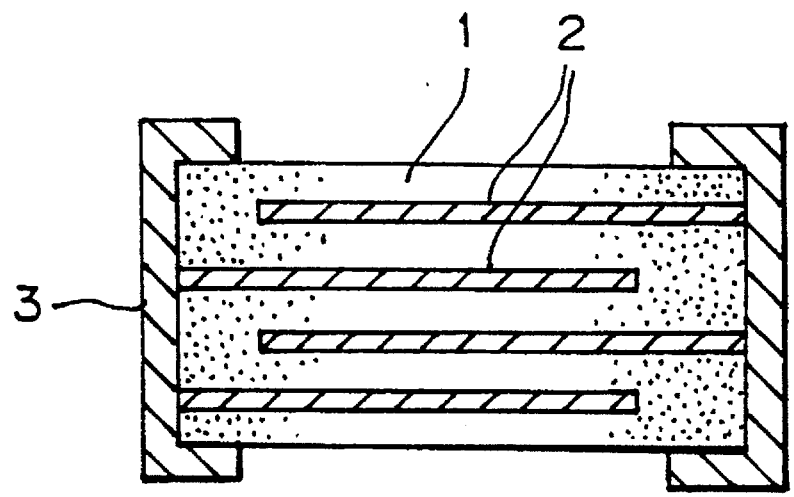
FIG. 3 is a cross-section of a multilayer capacitor.

The results on resistance to flexure of substrate are plotted as the mean of data for twenty test pieces in FIG. 1. Similarly, the results on the adhesion strength are plotted as the mean of data for twenty test pieces in FIG. 1. The results on heat shock are plotted as the number of cracked pieces in one hundred test pieces in FIG. 2. In these figures, numerals 1 to 11 assigned to symbols o and Δ indicate respective specimen numbers of the glass frit in Table 1.

As can be seen from the results shown in FIG. 1, the resistance of capacitor to flexure of substrate and the adhesion strength can be improved by incorporation of $Bi_2O_3$ into the glass frit in an amount of 4.0 to 30.2% by weight. In particular, the resistance of capacitor to flexure of substrate can be considerably improved when the content of $Bi_2O_3$ in the glass frit is set to 8.5 to 21.3% by weight. Further, the number of cracks due to heat shock is reduced considerably by adjusting the content of $Bi_2O_3$ in the glass frit to 4.0 to 30.2% by weight, thus making it possible to improve the resistance to heat shock of the capacitors.

From the results for specimens Nos. 10 and 11, the resistance to flexure of substrate and the adhesion strength are much lowered by the presence of ZnO in the glass frit.

It is thought that this results from reactions between the ceramic composition and ZnO in the glass frit. Thus, there is the necessity of reducing the content of ZnO contained as an inevitable impurity in the glass frit as much as possible, and preferably, 0.1% by weight or below.

According to the present invention, it is possible to prevent the dielectric ceramic from reaction with the glass frit, thus making it possible to prevent the ceramic capacitors from lowering of their characteristics. Further, it is possible to prevent the plating solution from seeping into the ceramic layers during plating.

What is claimed is:

1. A conductive paste comprising a conductive powder and a glass frit, wherein said glass frit consists essentially of ZnO, PbO, $B_2O_3$, $SiO_2$, $Al_2O_3$ and $Bi_2O_3$, and wherein the content of $Bi_2O_3$ in the glass frit is 4.0 to 30.2 percent by weight and wherein the content of ZnO present in said glass frit is 0.1% by weight or less.

2. The conductive paste according to claim 1 wherein said glass frit consists essentially, by weight, of 45 to 75% of PbO, 8 to 11% of $B_2O_3$, 3.5 to 5.0% of $SiO_2$, 5 to 15% of $Al_2O_3$, and 4.0 to 30.0% $Bi_2O_3$.

3. The conductive paste according to claim 2 wherein the content of $Bi_2O_3$ is 8.5 to 21.3%.

4. The conductive paste according to claim 1 wherein the content of $Bi_2O_3$ is 8.5 to 21.3%.

5. A multilayered ceramic capacitor comprising internal electrodes layers separated one another by ceramic dielectric layers, and two external electrodes connected to alternate internal electrodes, wherein said external electrodes consist essentially of conductive powder and a glass frit consisting essentially of ZnO, PbO, $B_2O_3$, $SiO_2$, $Al_2O_3$ and $Bi_2O_3$, the content of $Bi_2O_3$ in the glass frit being 4.0 to 30.2 percent by weight and the content of ZnO in said glass frit being 0.1% by weight or less.

6. The multilayered ceramic capacitor according to claim 5 wherein said ceramic dielectric layer is of a lead oxide-containing dielectric ceramic composition.

7. The multilayered ceramic capacitor according to claim 6, wherein said lead oxide-containing ceramic composition is selected from the group consisting of $Pb(Zr_{0.52}Ti_{0.48})O_3$, $Pb(Fe_{2/3}W_{1/3})O_3$—$Pb(Fe_{1/2}Nb_{1/2})O_3$, $Pb(Mg_{1/3}Nb_{2/3})O_3$—$PbTiO_3$, $Pb(Ni_{1/3}Nb_{2/3})O_3$—$Pb(Mg_{1/2}W_{1/2})O_3$—$PbTiO_3$, and $Pb(Mg_{1/3}Nb_{2/3})O_3$—$Pb(Ni_{1/3}Nb_{2/3})O_3$—$PbTiO_3$.

8. The multilayer ceramic capacitor according to claim 7, wherein said glass frit consists essentially, by weight, of 45 to 75% of PbO, 8 to 11% of $B_2O_3$, 3.5 to 5.0% of $SiO_2$, 5 to 15% of $Al_2O_3$, and 4.0 to 30.0% $Bi_2O_3$.

9. The multilayer ceramic capacitor according to claim 8 wherein the content of $Bi_2O_3$ is 8.5 to 21.3%.

10. The multilayer ceramic capacitor according to claim 5, wherein said glass frit consists essentially, by weight, of 45 to 75% of PbO, 8 to 11% of $B_2O_3$, 3.5 to 5.0% of $SiO_2$, 5 to 15% of $Al_2O_3$, and 4.0 to 30.0% $Bi_2O_3$.

11. The multilayer ceramic capacitor according to claim 10 wherein the content of $Bi_2O_3$ is 8.5 to 21.3%.

12. The multilayer ceramic capacitor according to claim 5 wherein the content of $Bi_2O_3$ is 8.5 to 21.3%.

* * * * *